(12) United States Patent
Janeczek et al.

(10) Patent No.: US 9,849,057 B1
(45) Date of Patent: Dec. 26, 2017

(54) STROLLER ROLLATOR

(71) Applicant: MORE JOYFUL LIVING, LLC, Hershey, PA (US)

(72) Inventors: Jane Leader Janeczek, Hershey, PA (US); Theodore Janeczek, Hershey, PA (US); David Celento, Pittsburgh, PA (US)

(73) Assignee: More Joyful Living, LLC, Hershey, PA (US)

( * ) Notice: Subject to any disclaimer, the term of this patent is extended or adjusted under 35 U.S.C. 154(b) by 0 days.

(21) Appl. No.: 15/680,674

(22) Filed: Aug. 18, 2017

Related U.S. Application Data

(60) Provisional application No. 62/423,879, filed on Nov. 18, 2016.

(51) Int. Cl.
| | |
|---|---|
| *A61H 3/04* | (2006.01) |
| *A61G 5/08* | (2006.01) |
| *B60T 7/08* | (2006.01) |
| *B60T 1/06* | (2006.01) |

(52) U.S. Cl.
CPC ............. *A61H 3/04* (2013.01); *A61G 5/0883* (2016.11); *A61H 2003/046* (2013.01); *A61H 2203/0406* (2013.01); *A61H 2203/0425* (2013.01); *B60T 1/065* (2013.01); *B60T 7/08* (2013.01)

(58) Field of Classification Search
CPC ........... B62B 3/007; B62B 5/08; B62B 5/082; B62B 5/085; B62B 7/00; B62B 7/002; B62B 7/004; B62B 7/006
See application file for complete search history.

(56) References Cited

U.S. PATENT DOCUMENTS

| | | | |
|---|---|---|---|
| 1,448,783 | A | 3/1923 | Blewitt |
| 1,942,112 | A | 1/1934 | Mcquilkin |
| 2,485,016 | A | 10/1949 | Rideout |
| 2,810,429 | A | 10/1957 | Lane |
| 3,736,021 | A | 5/1973 | MacLaren |
| 3,840,034 | A | 10/1974 | Smith |
| 4,211,309 | A | 7/1980 | Ruggiero |
| 4,245,849 | A | 1/1981 | Thiboutot |

(Continued)

FOREIGN PATENT DOCUMENTS

WO    WO2014074415 A1    5/2014

*Primary Examiner* — John Walters
*Assistant Examiner* — James Triggs
(74) *Attorney, Agent, or Firm* — McNees Wallace & Nurick LLC

(57) ABSTRACT

A rollator is disclosed, including first and second upright members, each including handle portions, wheels, hinges disposed between the wheels and the handle portions, channels disposed along the upright members between the hinges and the wheels, and lateral hinges orthogonal to the hinges. First and second foldable support members having wheels are attached to the hinges. At least one lateral support member is disposed between and attached to the lateral hinges, and includes an intermediate hinge. Brake systems include brake lines communicating between brake controls and brakes. In a reversible storage configuration, the foldable support members are rotated to be at least partially disposed in the channels, and the lateral hinges and intermediate hinge rotate to collapse the lateral support member, bringing the upright members with the folded foldable support members adjacent to one another.

20 Claims, 10 Drawing Sheets

(56) References Cited

U.S. PATENT DOCUMENTS

| | | |
|---|---|---|
| 4,643,211 A | 2/1987 | Morris et al. |
| 4,700,730 A | 10/1987 | Samuelson et al. |
| 4,748,994 A | 6/1988 | Schultz et al. |
| 4,907,794 A | 3/1990 | Rose |
| 4,907,839 A | 3/1990 | Rose et al. |
| 4,962,781 A | 10/1990 | Kanbar |
| 5,188,138 A * | 2/1993 | Yamasaki ............... A61H 3/04 135/65 |
| 5,348,336 A | 9/1994 | Fernie et al. |
| D360,174 S | 7/1995 | Kjell et al. |
| 5,605,345 A | 2/1997 | Erfurth et al. |
| D385,233 S | 10/1997 | Doyle et al. |
| 5,716,063 A | 2/1998 | Doyle et al. |
| 5,816,593 A | 10/1998 | Che |
| 6,311,708 B1 | 11/2001 | Howle |
| 6,338,355 B1 | 1/2002 | Cheng |
| 6,378,663 B1 | 4/2002 | Lee |
| 6,659,478 B2 | 12/2003 | Hallgrimsson et al. |
| D503,909 S | 4/2005 | Tolfsen et al. |
| 7,000,938 B2 | 2/2006 | Watkins |
| 7,001,313 B1 | 2/2006 | Crnkovich |
| 7,017,936 B2 | 3/2006 | Huang |
| D519,423 S | 4/2006 | Tolfsen |
| 7,179,200 B1 * | 2/2007 | Wu ......................... A61G 5/10 135/67 |
| 7,182,179 B2 | 2/2007 | Tolfsen |
| 7,219,906 B2 | 5/2007 | Hallgrimsson et al. |
| 7,370,734 B2 | 5/2008 | Hallgrimsson |
| 7,377,285 B2 | 5/2008 | Karasin et al. |
| 7,481,445 B1 | 1/2009 | Danziger |
| D623,559 S | 9/2010 | Yamamoto et al. |
| 7,837,208 B2 | 11/2010 | Willis |
| 8,215,652 B2 | 7/2012 | Dashew et al. |
| 8,240,437 B2 | 8/2012 | Liljedahl |
| 8,434,780 B2 | 5/2013 | Li |
| 8,439,376 B2 | 5/2013 | Willis et al. |
| 8,454,048 B1 | 6/2013 | Regan et al. |
| 8,511,694 B2 | 8/2013 | Bradshaw et al. |
| 8,534,683 B2 | 9/2013 | Lautzenhiser et al. |
| 8,596,658 B1 | 12/2013 | Dashew et al. |
| 8,678,425 B2 | 3/2014 | Schaaper et al. |
| 8,708,363 B1 | 4/2014 | Chang |
| 8,840,124 B2 | 9/2014 | Serhan et al. |
| 8,840,125 B2 | 9/2014 | Huang |
| D721,620 S | 1/2015 | Huang |
| 8,936,262 B2 | 1/2015 | Nabeta |
| D728,920 S | 5/2015 | Touhey et al. |
| 9,173,802 B2 | 11/2015 | Willis |
| 2003/0151232 A1 * | 8/2003 | Li ........................... A61G 5/08 280/648 |
| 2010/0313924 A1 | 12/2010 | Cho |
| 2012/0090926 A1 | 4/2012 | Dunlap |
| 2013/0062845 A1 | 3/2013 | Huang |
| 2014/0084559 A1 | 3/2014 | Fang |
| 2015/0048598 A1 | 2/2015 | Freeman |
| 2015/0075575 A1 | 3/2015 | Karlovich |
| 2015/0297439 A1 | 10/2015 | Karlovich |

* cited by examiner

STROLLER ROLLATOR

RELATED APPLICATIONS

This application claims the benefit of and priority to U.S. Prov. App. No. 62/423,879, filed Nov. 18, 2016, which is hereby incorporated by reference in its entirety.

FIELD OF THE INVENTION

The present invention is directed to mobility aids. More particularly, the present invention is directed to mobility aids that compress in at least two dimensions for storage.

BACKGROUND OF THE INVENTION

Rollators are mobility aid devices that incorporate wheels onto walker-like devices to further improve mobility. Rollators often incorporate a seat, which is incorporated into the support and rigidity structure of the device.

Rollators, while providing important lifestyle and mobility-improving benefits to persons having limited movement capabilities, whether due to age, injury, illness, or disability, suffer from significant disadvantages that limit the benefits provided by the rollators, or introduce new disadvantages or inconveniences to persons making use of the devices. By way of non-limiting example, existing rollators are bulky to store (particularly in communal settings such as assisted living facilities), are difficult to disassemble, are inconveniently bulky to stow (particularly in vehicles), fail to provide adequate support to assist users in rising from a seated position, are frequently unsuited to outdoor conditions or non-ideal terrain, are typically unattractive, with tubular frames and clinical aesthetics, include exposed brake lines which may present a safety hazard or mobility impediment, may be ergonomically predisposed to encourage poor posture and exacerbate osteoporosis, have insufficiently effective brakes, have seats which interfere with ideal walking stride length, do not provide adjustable or variable resistance, do not permit the seat to be removed to increase stride area, do not have ventilated seats, do not provide reversible seat backs, do not provide sufficiently supportive and sized seat backs, are unable to be operated as a light-duty assisted transporter, do not provide independent braking for improved directional changes, do not provide a parking brake which does not slip, are unable to be hung on a hook or rail in a tight bundle or otherwise for compact storage, do not permit significant custom identity personalization by users, or include various combinations of these disadvantages. Those rollators which are designed to collapse into a more compact shape merely fold into a flat configuration, which remains bulky, difficult to manipulate, and inconvenient to stow.

A mobility aid that does not suffer from one or more of the above drawbacks would be desirable in the art.

BRIEF DESCRIPTION OF THE INVENTION

In an exemplary embodiment, a rollator includes a first upright member and a second upright member. The first upright member includes a first handle portion at an upper end of the first upright member, a first wheel at a lower end of the first upright member, a first hinge disposed between the first wheel and the first handle portion, a first channel disposed along the first upright member between the first hinge and the first wheel, and at least one first lateral hinge orthogonal to the first hinge. The second upright member includes a second handle portion at an upper end of the second upright member, a second wheel at a lower end of the second upright member, a second hinge disposed between the second wheel and the second handle portion, a second channel disposed along the second upright member between the second hinge and the second wheel, and at least one second lateral hinge orthogonal to the second hinge. The second upright member is aligned parallel to the first upright member. The rollator further includes a first foldable support member and a second foldable support member. The first foldable support member includes an upper end of the first foldable support member attached to the first hinge, a lower end of the first foldable support member including a third wheel, and a conformation which fits at least partially within the first channel. The second foldable support member includes an upper end of the second foldable support member attached to the second hinge, a lower end of the second foldable support member including a fourth wheel, and a conformation which fits at least partially within the second channel. The second foldable support member is aligned parallel to the first foldable support member. The rollator further includes at least one lateral support member. The at least one lateral support member is disposed between and attached to the first lateral hinge and the second lateral hinge. The at least one support member includes an intermediate hinge disposed between the first lateral hinge and the second lateral hinge. The rollator further includes a first brake system and a second brake system. The first brake system includes a first brake control disposed on the first handle portion, a first brake associated with one of the first wheel and the third wheel, and a first brake line communicating between the first brake control and the first brake. The second brake system includes a second brake control disposed on the second handle portion, a second brake associated with one of the second wheel and the fourth wheel, and a second brake line communicating between the second brake control and the second brake. The first foldable support member and the second foldable support member are arranged and disposed to rotate at the first hinge and the second hinge between a storage configuration in which the first foldable support member is at least partially disposed within the first channel and the second foldable support member is at least partially disposed within the second channel, and an engaged configuration in which the first foldable support member and the second foldable support member are reversibly locked at a predetermined angle to the first upright member and the second upright member. The at least one lateral support member is arranged and disposed to transition between the storage configuration in which the first lateral hinge, the second lateral hinge, and the intermediate hinge are in a collapsed arrangement with the first upright member adjacent to the second upright member, and the engaged configuration in which the first lateral hinge, the second lateral hinge, and the intermediate hinge are in an extended arrangement with the first upright member distal from the second upright member across an extended length of the at least one lateral support member, the intermediate hinge being reversibly locked in the extended arrangement.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
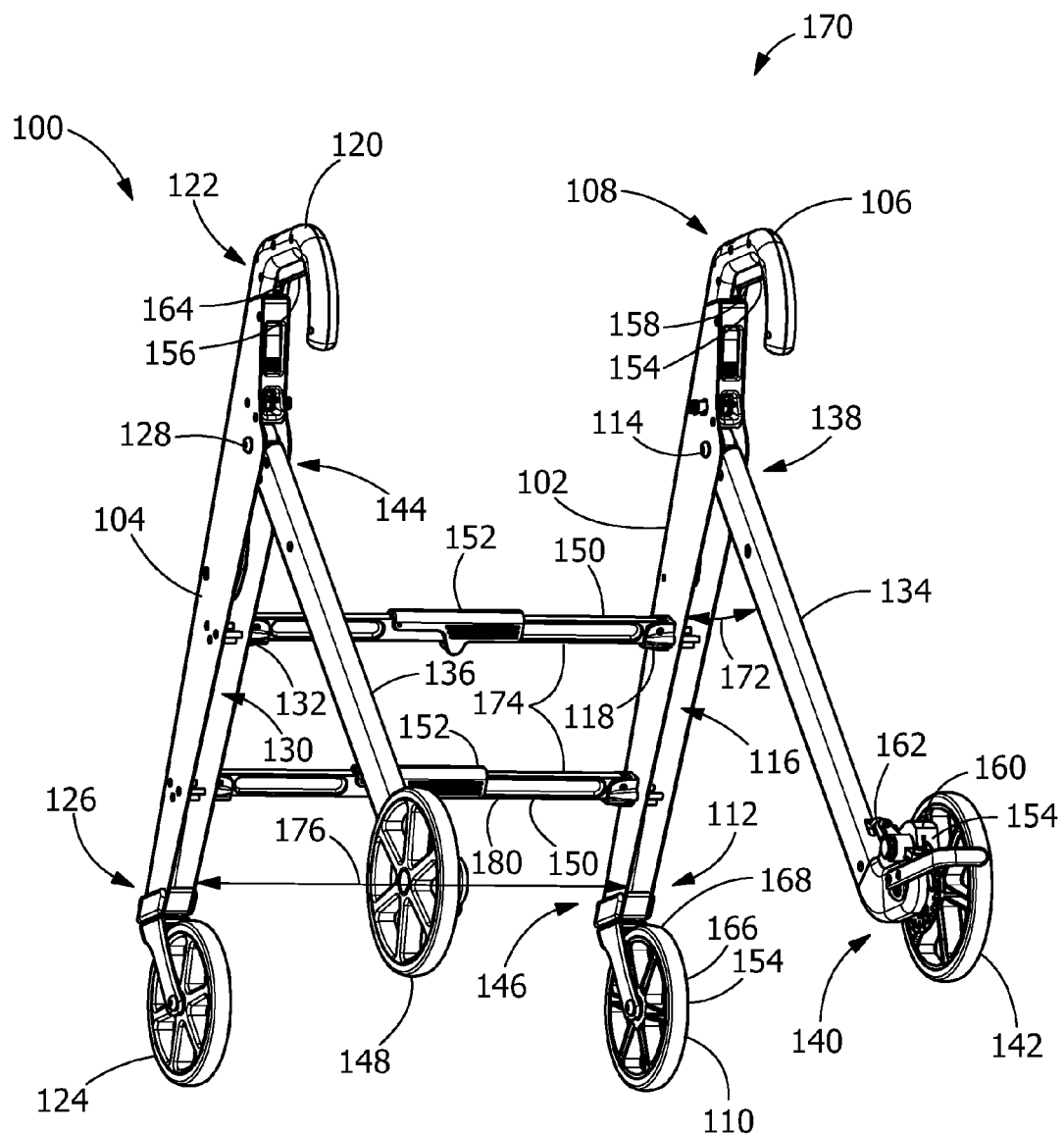
FIG. 1 is a perspective view of a rollator in an extended configuration, according to an embodiment of the present disclosure.

Provided are exemplary rollators. Embodiments of the present disclosure, in comparison to rollators not utilizing one or more features disclosed herein, decrease storage bulk, increase stowability, increase support for rising from a seated position, improve stability on non-ideal terrain, reduce safety hazards and mobility impediments, improve ergonomics, increase brake effectiveness, increase available stride length, provide adjustable or variable resistance, permit the seat to be removed to increase stride area, improve seat ventilation, provide reversible seat backs, increase support and size of seat backs, increase operability as a light-duty assisted transporter, provide independent braking for improved directional changes, provide a parking brake which does not slip, are able to be hung on a hook or rail in a tight bundle or otherwise for compact storage, permit significant custom identity personalization by users, or a combination thereof. Although discussed primarily herein in the context of rollators, it will be appreciated that the invention is not so limited and that principles of the invention can be applied to other types of mobility aids as well, including walkers, for example.

Referring to FIGS. 1-4, in one embodiment, a rollator 100 includes a first upright member 102 and a second upright member 104.

The first upright member 102 includes a first handle portion 106 at an upper end 108 of the first upright member 102, a first wheel 110 at a lower end 112 of the first upright member 102, a first hinge 114 disposed between the first wheel 110 and the first handle portion 106, a first channel 116 disposed along the first upright member 102 between the first hinge 114 and the first wheel 110, and at least one first lateral hinge 118 orthogonal to the first hinge 114.

The second upright member 104 includes a second handle portion 120 at an upper end 122 of the second upright member 104, a second wheel 124 at a lower end 126 of the second upright member 104, a second hinge 128 disposed between the second wheel 124 and the second handle portion 120, a second channel 130 disposed along the second upright member 104 between the second hinge 128 and the second wheel 124, and at least one second lateral hinge 132 orthogonal to the second hinge 128. The second upright member 104 is aligned parallel to the first upright member 102.

The rollator 100 further includes a first foldable support member 134 and a second foldable support member 136.

The first foldable support member 134 includes an upper end 138 of the first foldable support member 134 attached to the first hinge 114, a lower end 140 of the first foldable support member 134 including a third wheel 142, and a conformation which fits at least partially within the first channel 116.

The second foldable support member 136 includes an upper end 144 of the second foldable support member 136 attached to the second hinge 128, a lower end 146 of the second foldable support member 136 including a fourth wheel 148, and a conformation which fits at least partially within the second channel 130. The second foldable support member 136 is aligned parallel to the first foldable support member 134.

The rollator 100 further includes at least one lateral support member 150. The at least one lateral support member 150 is disposed between and attached to the first lateral hinge 118 and the second lateral hinge 132. The at least one lateral support member 150 includes an intermediate hinge 152 disposed between the first lateral hinge 118 and the second lateral hinge 132.

The rollator 100 further includes a first brake system 154 and a second brake system 156.

The first brake system 154 includes a first brake control 158 disposed on the first handle portion 106, a first brake 160 associated with one of the first wheel 110 and the third wheel 142, and a first brake line 162 communicating between the first brake control 158 and the first brake 160. The first brake system 154 may include secondary brakes on the same wheel as the first brake 160 is associated with, the other wheel of the first wheel 110 and the third wheel 142, or both.

The second brake system 156 includes a second brake control 164 disposed on the second handle portion 120, a second brake 166 associated with one of the second wheel 124 and the fourth wheel 148, and a second brake line 168 communicating between the second brake control 164 and the second brake 166. The first brake system 156 may include secondary brakes on the same wheel as the second brake 166 is associated with, the other wheel of the second wheel 124 and the fourth wheel 148, or both.

In one embodiment (not shown), the first brake system 154 and the second brake system 156 are linked, such that the first brake control 158 may control the first brake 160 and the second brake 166, the second brake control 164 may control the first brake 160 and the second brake 166, or each of the first brake control 158 and the second brake control 164 may control the first brake 160 and the second brake 166. The first brake system 154 and the second brake system 156 may include a selector for selecting between the aforementioned brake control options.

The first foldable support member 134 and the second foldable support member 136 are arranged and disposed to rotate at the first hinge 114 and the second hinge 128, respectively, between a storage configuration 400 (see FIGS. 4 and 9) in which the first foldable support member 134 is at least partially disposed within the first channel 116 and the second foldable support member 136 is at least partially disposed within the second channel 130, and an engaged configuration 170 in which the first foldable support member 134 and the second foldable support member 136 are reversibly locked at a predetermined angle 172 to the first upright member 102 and the second upright member 104.

The at least one lateral support member 150 is arranged and disposed to transition between the storage configuration 400 in which the first lateral hinge 118, the second lateral hinge 132, and the intermediate hinge 152 are in a collapsed arrangement 402 (see FIGS. 1, 4, and 9) with the first upright member 102 adjacent to the second upright member 104, and the engaged configuration 170 in which the first lateral hinge 118, the second lateral hinge 132, and the intermediate hinge 152 are in an extended arrangement 174 with the first upright member 102 distal from the second upright member 104 across an extended length 176 of the at least one lateral support member 150, the intermediate hinge 152 being reversibly locked in the extended arrangement 174.

Figure 2:
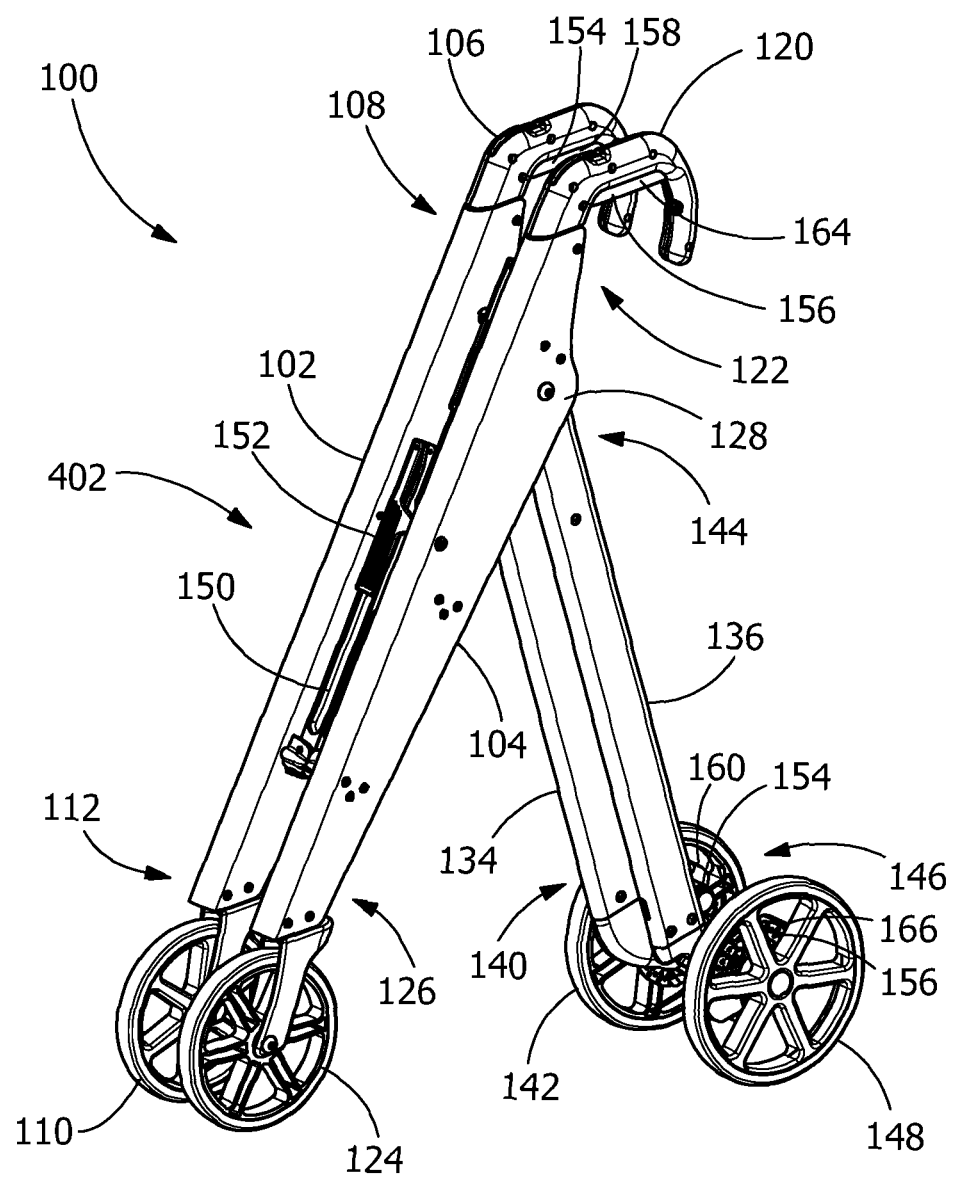
FIG. 2 is a perspective view of the rollator of FIG. 1 transitioning between the extended configuration and a storage configuration, according to an embodiment of the present disclosure.
Figure 3:
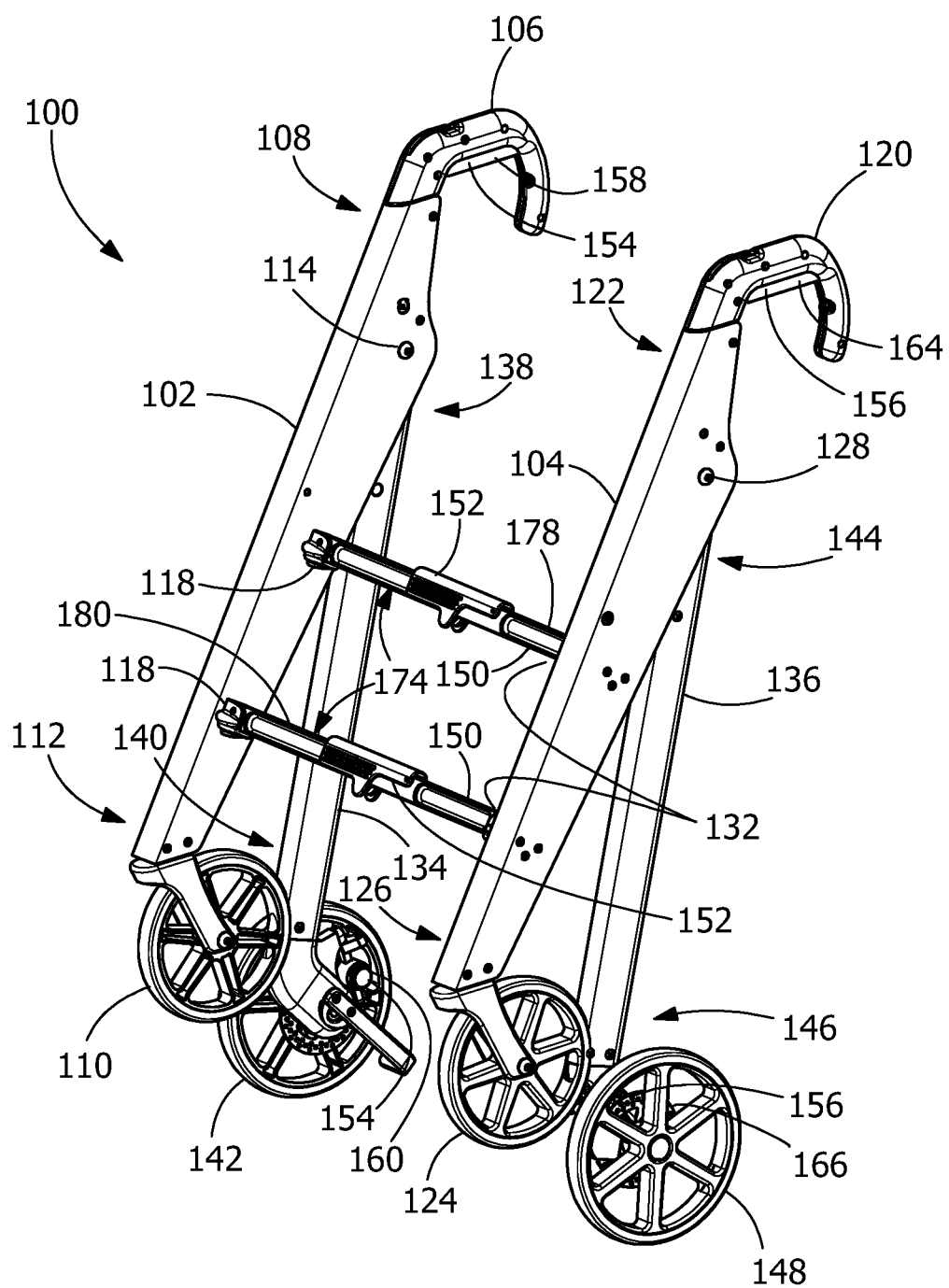
FIG. 3 is a perspective view of the rollator of FIG. 1 transitioning between the extended configuration and a storage configuration, according to an embodiment of the present disclosure.
Figure 4:
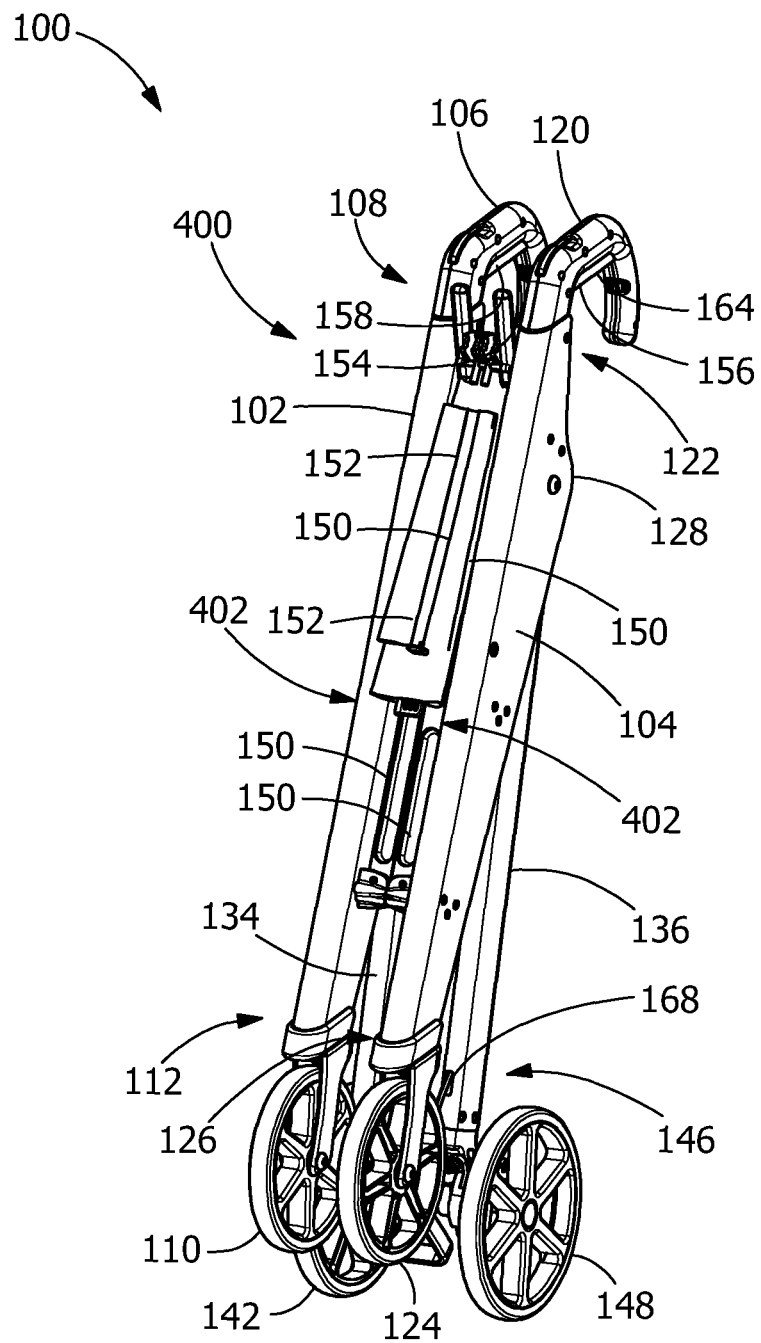
FIG. 4 is a perspective view of the rollator of FIG. 1 in the storage configuration, according to an embodiment of the present disclosure.
Figure 5:
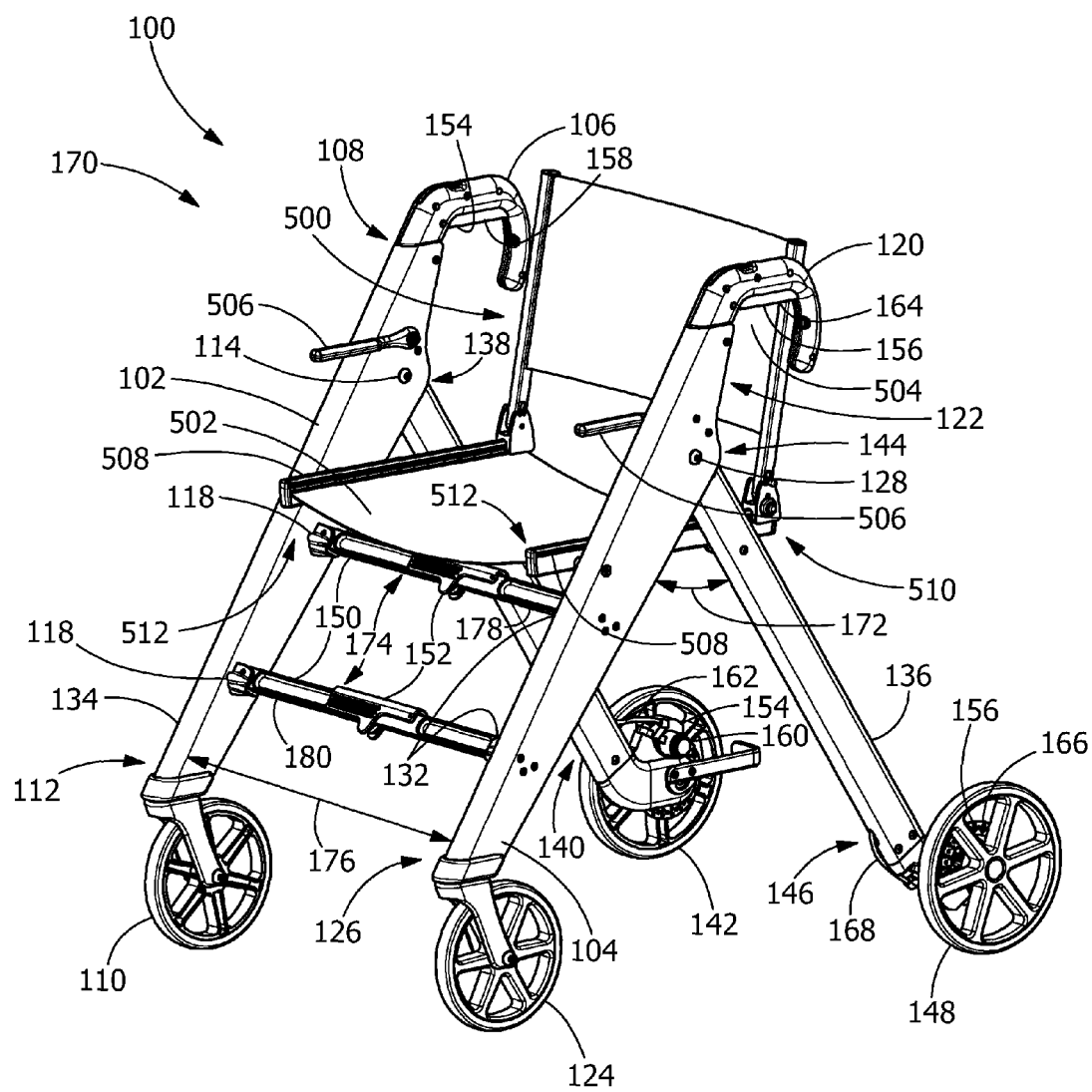
FIG. 5 is a perspective view of the rollator of FIG. 1 including a removable seat, according to an embodiment of the present disclosure.

Referring to FIGS. 2 and 3, the transition between the storage configuration 400 and the engaged configuration 170 may proceed by first rotating the first foldable support member 134 and the second foldable support member 136 and then rotating the first lateral hinge 118, the second lateral hinge 132, and the intermediate hinge 152, or by first rotating the first lateral hinge 118, the second lateral hinge 132, and the intermediate hinge 152 and then rotating the first foldable support member 134 and the second foldable support member 136. The first foldable support member 134 and the second foldable support member 136 are rotatable simultaneously or independently. In one embodiment, the intermediate hinge 152 reversibly locks in the engaged configuration 170, and must be released in order to rotate to the storage configuration 400.

In one embodiment, at least one of the first brake 160 and the second brake 166 is a disc brake. In a further embodiment, both of the first brake 160 and the second brake 166 are disc brakes. The first brake 160 and the second brake 166 may be independently operated or jointly operated.

In one embodiment, the first wheel 110, the second wheel 124, the third wheel 142, and the fourth wheel 148 are arranged and disposed such that in the storage configuration 400, the first wheel 110 and the fourth wheel 148 are at least partially disposed between the second wheel 124 and the third wheel 142. In another embodiment, the first wheel 110, the second wheel 124, the third wheel 142, and the fourth wheel 148 are arranged and disposed such that in the storage configuration 400 the second wheel 124 and the third wheel 142 are at least partially disposed between the first wheel 110 and the fourth wheel 148.

The at least one lateral support member 150 may be disposed at any suitable position along the first upright member 102 and the second upright member 104. In one embodiment, the at least one lateral support member 150 is disposed below the first hinge 114 and second hinge 128 and above the first wheel 110 and the second wheel 124. The rollator 100 may include any suitable number of lateral support members 150. In one embodiment, the rollator 100 includes a first lateral support member 178 and a second lateral support member 180, wherein the first lateral support member 178 is disposed below the first hinge 114 and second hinge 128 and above the first wheel 110 and the second wheel 124, and the second lateral support member 180 is disposed below the first lateral support member 178 and above the first wheel 110 and the second wheel 124.

In one embodiment, at least one of the first brake system 154 and the second brake system 156 is reversibly lockable in a fully engaged configuration, which may be referred to as a "parking brake". In further embodiment, each of the first brake system 154 and the second brake system 156 is reversibly lockable in the fully engaged configuration. In another embodiment, each of the first brake system 154 and the second brake system 156 is reversibly lockable in a partially engaged configuration, independently or together, to provide variable degrees of resistance, which may be referred to as a "resistance brake". Such variable degrees of resistance may assist users in need of assistance achieving improved or optimal balance. The parking brake and the resistance brake may be engaged by any suitable mechanism, including, but not limited to, a switch or similar device located at the first brake control 158, the second brake control 160, or both, a foot-operated control located at the first brake 160, the second brake 166, or both, or combination thereof. The parking brake and the resistance brake may be engaged by the same mechanism or different mechanisms. In one embodiment, the parking brake may be engaged by a flip-lever, and the resistance brake may be engaged by and controlled by a dial or slide.

The rollator 100 may include any suitable dimensions in the engaged configuration 170 and the storage configuration 400. In one embodiment, in the storage configuration 400, the rollator 100 includes a height of less than about 45 inches, a width of less than about 12 inches, and a depth of less than about 18 inches, alternatively a height of less than about 40 inches, a width of less than about 9 inches, and a depth of less than about 15 inches, alternatively a height of about 38.6 inches, a width of about 8.5 inches, and a depth of about 14.1 inches, alternatively a height of less than about 38.6 inches, a width of less than about 8.5 inches, and a depth of less than about 14.1 inches, or any combination of the such dimensions.

In one embodiment, the height of the rollator 100 is adjustable by at least about 2 inches, alternatively at least about 3 inches, alternatively at least about 3.5 inches, alternatively at least about 4 inches, while in the engaged configuration 170.

The predetermined angle 172 of the engaged configuration 170 from the first foldable support member 134 and the second foldable support member 136 to the first upright member 102 and the second upright member 104 may be any suitable angle, including, but not limited to, an angle between about 15° and about 120°, alternatively between about 20° and about 90°, alternatively between about 25° and about 75°, alternatively between about 30° and about 60°, alternatively between about 45° and about 75°, alternatively between about 60° and about 70°, alternatively between about 63° and about 67°, alternatively about 64°. As used herein, angle measurements are measured between the centers of the members at the points closest to the wheels, with the hinges serving as the vertices of the angles.

In one embodiment, at least about 50% of the first brake line 162 is disposed within one of the first upright member 102 and the first foldable support member 134, and at least about 50% of the second brake line 168 is disposed within one of the second upright member 104 and the second foldable support member 136, alternatively at least about 60% of the first brake line 162 and at least about 60% of the second brake line 168, alternatively at least about 70% of the first brake line 162 and at least about 70% of the second brake line 168, alternatively at least about 75% of the first brake line 162 and at least about 75% of the second brake line 168, alternatively at least about 80% of the first brake line 162 and at least about 80% of the second brake line 168, alternatively at least about 85% of the first brake line 162 and at least about 85% of the second brake line 168, alternatively at least about 90% of the first brake line 162 and at least about 90% of the second brake line 168, alternatively at least about 95% of the first brake line 162 and at least about 95% of the second brake line 168.

Referring to FIGS. 5-8, in one embodiment, the rollator 100, includes a removable seat 500 having a seat bottom 502 and a seat back 504. The removable seat 500 is reversibly attached to the first upright member 102 and the second upright member 104 above the at least one lateral support member 150. The removable seat 500 may further be attached to the first foldable support member 134 and the second foldable support member 136.

The rollator may include removable support arms 506 positioned at a height suitable for stabilizing and aiding a transition of an individual between a seated and a standing position. The removable support arms 506 may rotate by about 150° to 180° between a first position and a second position.

Figure 6:
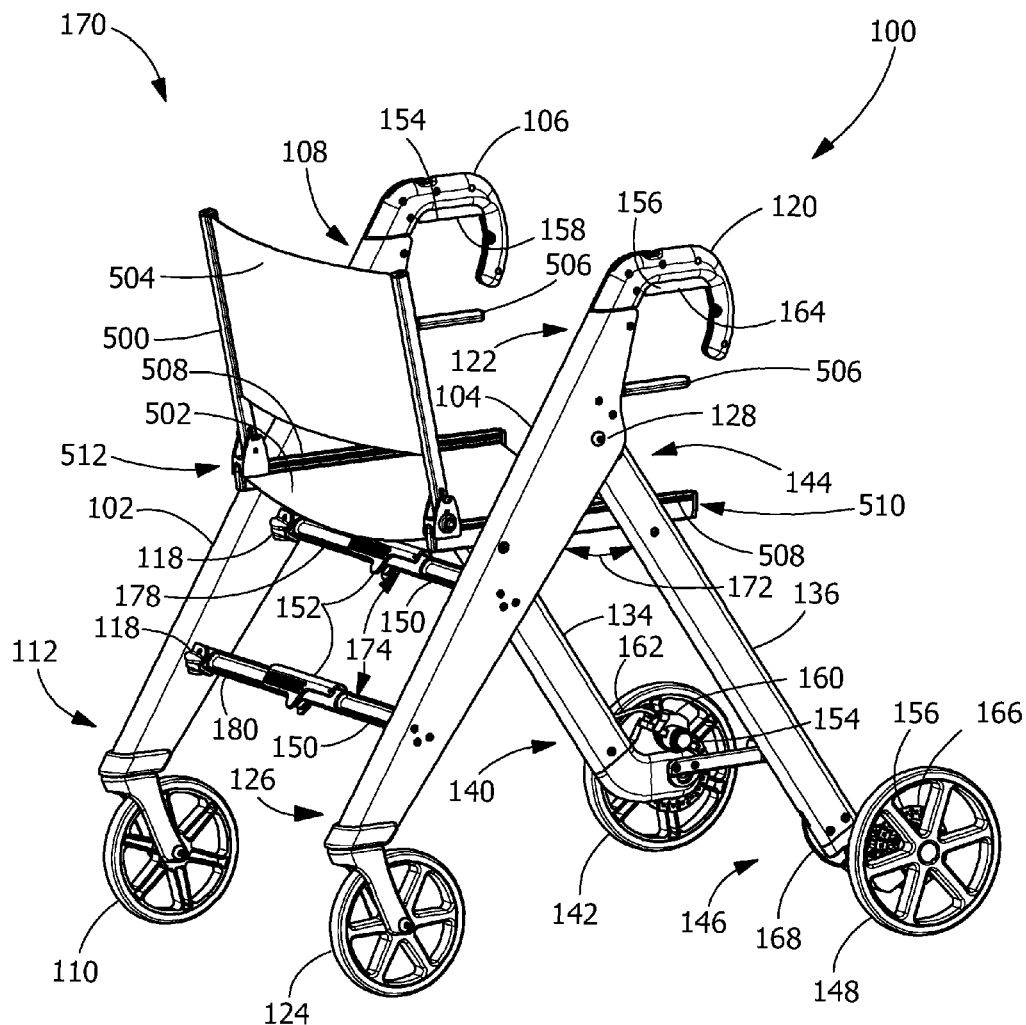
FIG. 6 is a perspective view of the rollator of FIG. 5 with the seat back reversed, according to an embodiment of the present disclosure.
Figure 7:
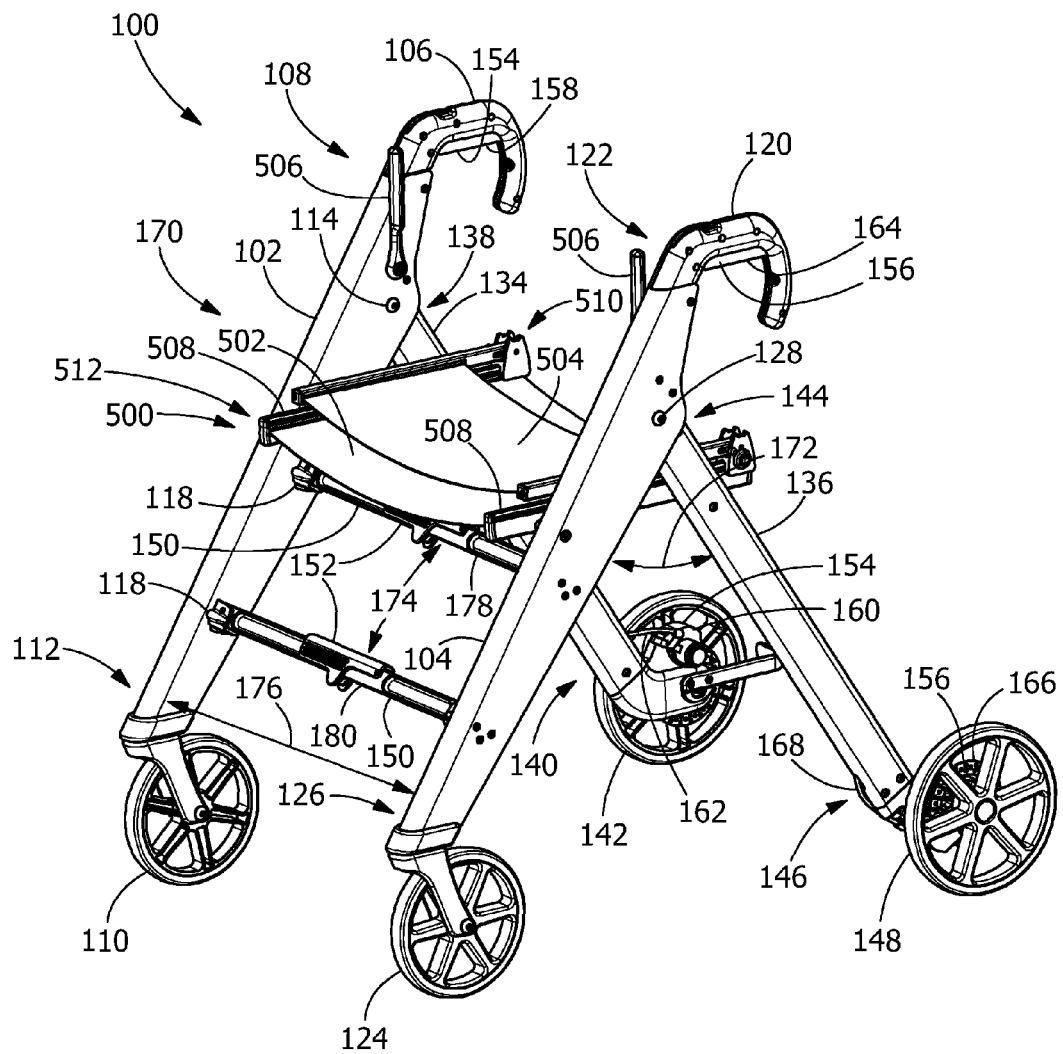
FIG. 7 is a perspective view of the rollator of FIG. 5 with the seat back folded, according to an embodiment of the present disclosure.

In one embodiment, the seat back 504 attaches to the seat bottom 502 on rails 508 along the seat bottom 504, and the removable seat 500 is arranged and disposed such that the seat back 504 is slideable between a first end 510 of the seat bottom 502 (FIG. 5) and a second end 512 of the seat bottom 502 (FIG. 6). The seat back 504 may reversibly lock at the first end 510 and the second end 512.

In one embodiment, the seat back 504 is arranged and disposed to rotate between an open position (FIGS. 5 and 6) in which the seat back is reversibly locked about perpendicular to the seat bottom 502, and a closed position (FIG. 7) in which the seat back 504 is reversibly locked about parallel to and adjacent to the seat bottom 502. "About perpendicular" may include a deviation from 90° within about ±20°, alternatively within about ±15°, alternatively within about ±10°, alternatively within about ±5°.

In one embodiment, the removable seat 500 is arranged and disposed to rotate between a first position (FIG. 8) in which the seat bottom 502 is reversibly locked about parallel to the first upright member 102 and the second upright member 104, and a second position (FIGS. 5-7) in which the seat bottom 502 is reversibly locked about parallel to a plane defined by the first wheel 110, the second wheel 124, the third wheel 142, and the fourth wheel 148.

Figure 8:
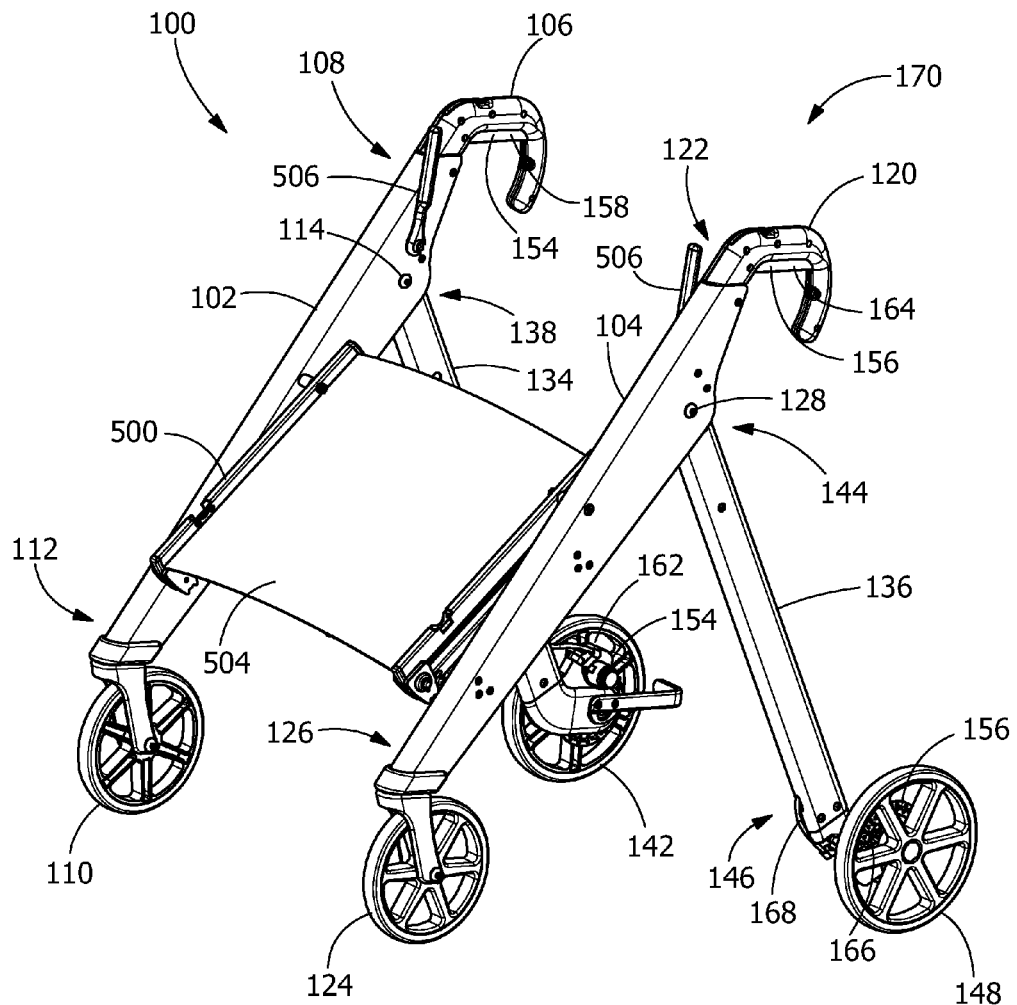
FIG. 8 is a perspective view of the rollator of FIG. 7 with the removable seat rotated, according to an embodiment of the present disclosure.
Figure 9:
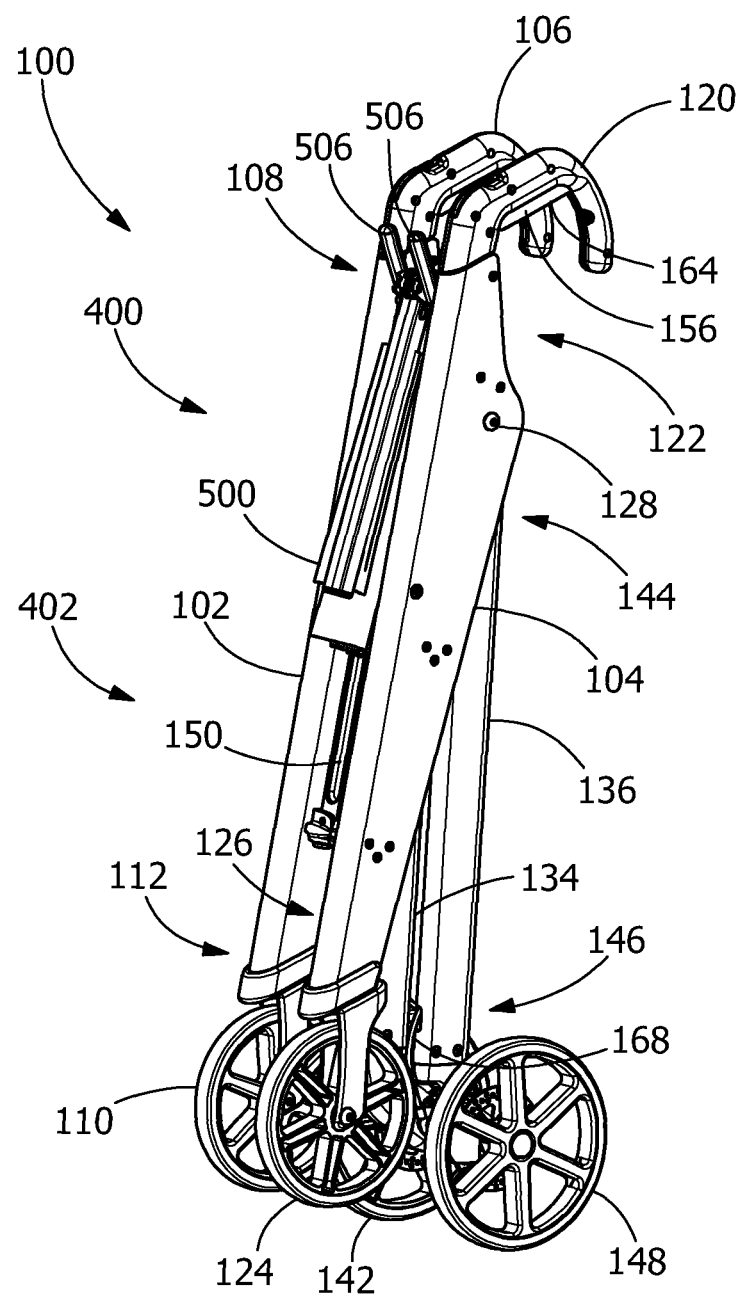
FIG. 9 is a perspective view of the rollator of FIG. 8 in the storage configuration, according to an embodiment of the present disclosure.

Referring to FIGS. 8 and 9, the removable seat 500 may be arranged and disposed to compress laterally when the rollator 100 transitions from the engaged configuration 170 (FIG. 8) to the storage configuration 400 (FIG. 9), and expand laterally when the rollator 100 transitions from the storage configuration 400 (FIG. 9) to the engaged configuration 170 (FIG. 8). In one embodiment, the seat back 504 and the seat bottom 502 include a foldable material.

Figure 10A:
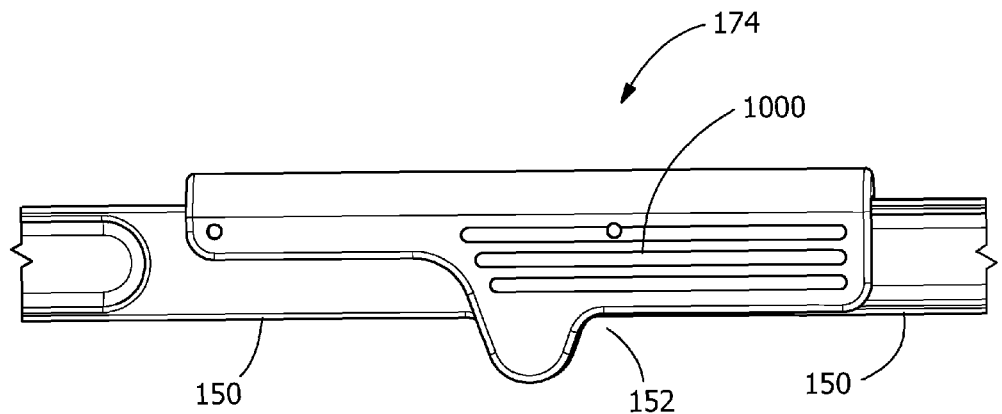
FIG. 10A is a perspective view of the intermediate hinge of FIG. 1 in an extended arrangement, according to an embodiment of the present disclosure.
Figure 10B:
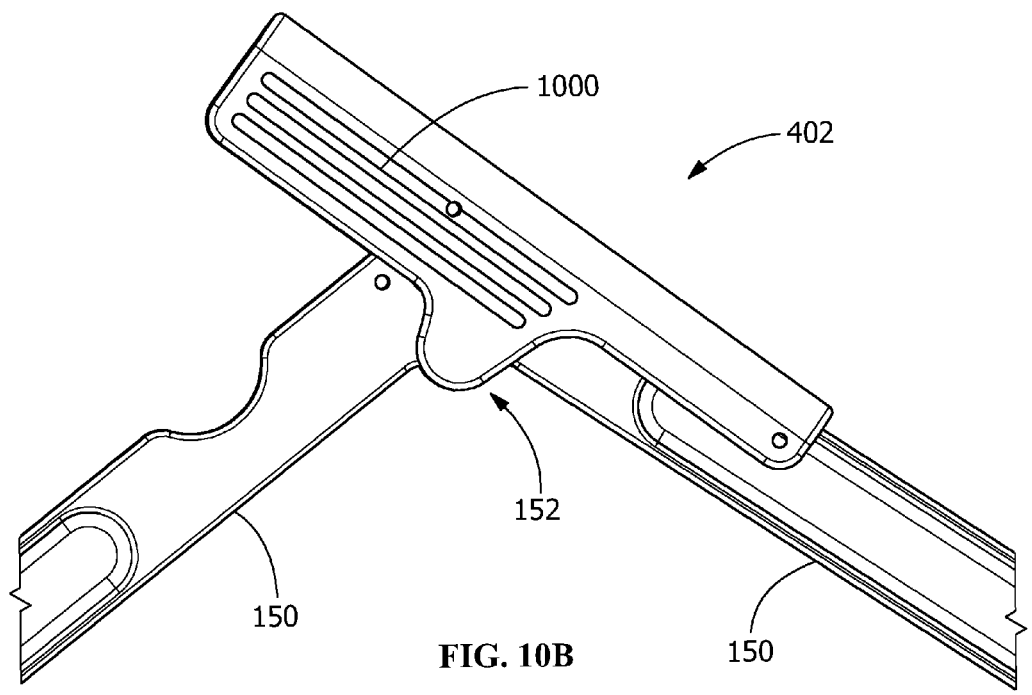
FIG. 10B is a perspective view of the intermediate hinge of FIG. 10A with the intermediate hinge in a collapsed arrangement, according to an embodiment of the present disclosure.

Referring to FIGS. 10A and 10B, in one embodiment, the at least one lateral support member 150 includes a latch 1000 at the intermediate hinge 152. The latch 1000 at least partially covers the intermediate hinge 152, and may inhibit compression of fingers during the folding of the intermediate hinge 152. In one embodiment, the latch 1000 may unlock the intermediate hinge 1000 to transition from the extended arrangement 174 (FIG. 10A) to the collapsed arrangement 402 (FIG. 10B), by way of example through a rotating motion.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A rollator, comprising:
   a first upright member including a first handle portion at an upper end of the first upright member, a first wheel at a lower end of the first upright member, a first hinge disposed between the first wheel and the first handle portion, a first channel disposed along the first upright member between the first hinge and the first wheel, and at least one first lateral hinge orthogonal to the first hinge;
   a second upright member including a second handle portion at an upper end of the second upright member, a second wheel at a lower end of the second upright member, a second hinge disposed between the second wheel and the second handle portion, a second channel disposed along the second upright member between the second hinge and the second wheel, and at least one second lateral hinge orthogonal to the second hinge, the second upright member being aligned parallel to the first upright member;
   a first foldable support member including an upper end of the first foldable support member attached to the first hinge, a lower end of the first foldable support member including a third wheel, and a conformation which fits at least partially within the first channel;
   a second foldable support member including an upper end of the second foldable support member attached to the second hinge, a lower end of the second foldable support member including a fourth wheel, and a conformation which fits at least partially within the second channel, the second foldable support member being aligned parallel to the first foldable support member;
   at least one lateral support member, the at least one lateral support member being disposed between and attached to the first lateral hinge and the second lateral hinge, the at least one support member including an intermediate hinge disposed between the first lateral hinge and the second lateral hinge;
   a first brake system including a first brake control disposed on the first handle portion, a first brake associated with one of the first wheel and the third wheel, and a first brake line communicating between the first brake control and the first brake; and
   a second brake system including a second brake control disposed on the second handle portion, a second brake associated with one of the second wheel and the fourth wheel, and a second brake line communicating between the second brake control and the second brake,
   wherein the first foldable support member and the second foldable support member are arranged and disposed to rotate at the first hinge and the second hinge between a storage configuration in which the first foldable support member is at least partially disposed within the first channel and the second foldable support member is at least partially disposed within the second channel, and an engaged configuration in which the first foldable support member and the second foldable support member are reversibly locked at a predetermined angle to the first upright member and the second upright member, and wherein the at least one lateral support member is arranged and disposed to transition between the storage configuration in which the first lateral hinge, the second lateral hinge, and the intermediate hinge are in a collapsed arrangement with the first upright member adjacent to the second upright member, and the engaged configuration in which the first lateral hinge, the second lateral hinge, and the intermediate hinge are in an extended arrangement with the first upright member distal from the second upright member across an extended length of the at least one lateral support member, the intermediate hinge being reversibly locked in the extended arrangement.

2. The rollator of claim 1, wherein at least one of the first brake and the second brake is a disc brake.

3. The rollator of claim 1, wherein the first wheel, the second wheel, the third wheel, and the fourth wheel are arranged and disposed such that in the storage configuration, the first wheel and the fourth wheel are at least partially disposed between the second wheel and the third wheel, or the second wheel and the third wheel are at least partially disposed between the first wheel and the fourth wheel.

4. The rollator of claim 1, wherein the at least one lateral support member is disposed below the first hinge and second hinge and above the first wheel and the second wheel.

5. The rollator of claim 4, wherein the at least one lateral support member includes a first lateral support member and a second lateral support member.

6. The rollator of claim 5, wherein the second lateral support member is disposed below the first lateral support member and above the first wheel and the second wheel.

7. The rollator of claim 1, further including a removable seat having a seat bottom and a seat back.

8. The rollator of claim 7, wherein the removable seat reversibly attaches to the first upright member and the second upright member above the at least one lateral support member.

9. The rollator of claim 8, wherein the removable seat further attaches to the first foldable support member and the second foldable support member.

10. The rollator of claim 7, wherein the removable seat is arranged and disposed to rotate between a first position in which the seat bottom is reversibly locked about parallel to the first upright member and the second upright member, and a second position in which the seat bottom is reversibly locked about parallel to a plane defined by the first wheel, the second wheel, the third wheel, and the fourth wheel.

11. The rollator of claim 7, wherein the seat back is arranged and disposed to rotate between an open position in which the seat back is reversibly locked about perpendicular to the seat bottom, and a closed position in which the seat back is reversibly locked about parallel to and adjacent to the seat bottom.

12. The rollator of claim 7, wherein the seat back attaches to the seat bottom on a rail along the seat bottom, and the removable seat is arranged and disposed such that the seat back is slideable between a first end of the seat bottom and a second end of the seat bottom.

13. The rollator of claim 7, further including removable support arms positioned at a height suitable for stabilizing and aiding a transition of an individual between a seated and a standing position.

14. The rollator of claim 7, wherein the removable seat is arranged and disposed to compress laterally when the rollator transitions from the engaged configuration to the storage configuration, and expand laterally when the rollator transitions from the storage configuration to the engaged configuration.

15. The rollator of claim 1, wherein at least one of the first brake system and the second brake system is reversibly lockable in a fully engaged configuration.

16. The rollator of claim 1, wherein the rollator in the storage configuration includes a height of less than about 40 inches, a width of less than about 9 inches, and a depth of less than about 15 inches.

17. The rollator of claim 1, wherein a height of the rollator is adjustable by at least about 3 inches while in the engaged configuration.

18. The rollator of claim 1, wherein the predetermined angle is between about 20° and about 90°.

19. The rollator of claim 1, wherein at least one of the first brake system and the second brake system is reversibly lockable in a partially engaged configuration.

20. The rollator of claim 1, wherein at least about 50% of the first brake line is disposed within one of the first upright member and the first foldable support member, and at least about 50% of the second brake line is disposed within one of the second upright member and the second foldable support member.

* * * * *